S. A. KERR.
Churn.
No. 28,757.
Patented June 19, 1860.
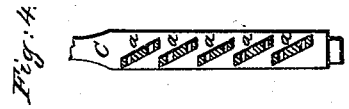
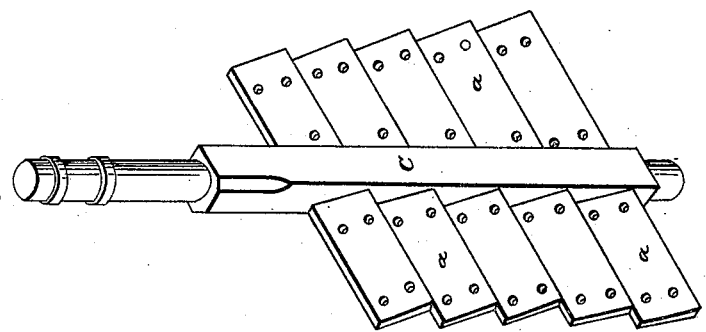
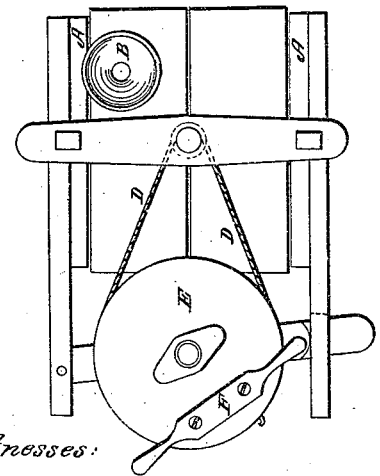
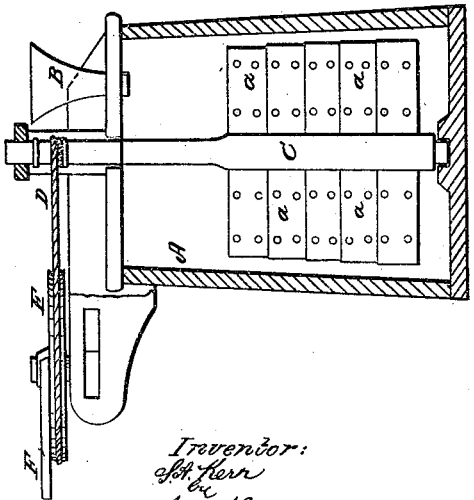
Witnesses:
Inventor:

UNITED STATES PATENT OFFICE.

SAMUEL A. KERR, OF ARBOR HILL, VIRGINIA.

CHURN.

Specification of Letters Patent No. 28,757, dated June 19, 1860.

*To all whom it may concern:*

Be it known that I, S. A. KERR, of Arbor Hill, in the county of Augusta and State of Virginia, have invented a new and useful Improvement in Churns; and I do hereby declare that the following is a full, clear, and exact description of the same, reference being had to the accompanying drawings, forming part of this specification.

Figure 1 is a top view, and Fig. 2, a vertical section of my improved churn. Fig. 3 is a perspective view of the dasher; Fig. 4, a section of the same.

Wherever the same letters occur in the several figures they indicate corresponding parts.

The nature of my invention consists in arranging blades or slats on a vibrating or turning dasher staff, so that they pass diagonally through the staff or set obliquely, one above another, after the manner of the slats of a window blind are placed. By this oblique arrangement of the blades or slats on a vibrating or turning dasher staff, the cream or milk will, when the staff is rapidly vibrating, be thrown downward, on one side of the staff, and upward, on the other side, at each back or forward movement; and it also will be caused to pass between the slats from one side of the churn to the other. Thus operating upon the cream causes it to be subjected to a very thorough agitation. The oblique arrangement of the slats likewise allows of the butter being gathered readily, as the bottom edge of one slat extends down to the top of another, and, thus, the passage of the butter, through the dasher is not likely to take place, if the motion imparted to the dasher, during the gathering operation is a gentle and regular one.

To enable others skilled in the art to make and use my invention I will proceed to describe its construction and operation A is the churn tub; its top has the end of an air funnel B passed through it, for the purpose of ventilating the interior of the churn.

C is the dasher. It is formed by passing flat blades or slats *a a* diagonally through a vertical staff, or arranging them, obliquely, one above another, on the same, in the manner represented in the drawing. The blades are either made solid or with perforations through them. The dasher, thus constructed, is fitted in the churn, in the ordinary manner or as represented; and the upper end of the staff is geared by a cord or chain D, with a reciprocating disk E, in the manner shown.

To operate the churn, lay hold of the handle F, of the disk and impart a reciprocating motion to the dasher. This motion causes the slats on one side of the dasher staff to throw the cream upward, and those on the other side to throw it downward. The cream thrown downward while the dasher moves forward passes between the slats to the right side of the churn tub, and that thrown upward passes between the slats to the left side of the churn tub; and vice versa, when the dasher is moved backward. The butter, after being produced, is gathered by reducing the speed of the dasher.

I do not claim the means shown for vibrating the dasher; nor do I claim the arrangement of the blades of the dasher in the manner shown in the churn patented by Wm. A. Virtres Decr. 9, 1856; but

What I claim as my invention and desire to secure by Letters Patent, is—

The manner herein described and shown of arranging the blades or slats *a a* on a vibrating or turning dasher staff for the purpose set forth.

The above specification of my improvement in churns, signed by me this 9th day of May, 1860.

S. A. KERR.

Witnesses:
GOODWIN Y. AT LEE,
W. YORKE AT LEE.